United States Patent [19]

Le Dall

[11] Patent Number: 4,468,318

[45] Date of Patent: Aug. 28, 1984

[54] APPARATUS FOR THE UNINTERRUPTED TREATMENT OF A LIQUID WITH ION EXCHANGE RESINS

[75] Inventor: Guy Le Dall, Maurepas, France

[73] Assignee: Permo S.A., Rueil Malmaison, France

[21] Appl. No.: 455,534

[22] Filed: Jan. 4, 1983

[30] Foreign Application Priority Data

Jan. 15, 1982 [FR] France ................. 82 00576

[51] Int. Cl.³ ............................................. C02F 1/42
[52] U.S. Cl. .................................. 210/96.1; 210/98; 210/140; 210/143
[58] Field of Search ............... 210/662, 687, 98, 140, 210/142, 143, 190, 191, 256, 264, 269, 278, 88, 96.1

[56] References Cited

U.S. PATENT DOCUMENTS

| | | | |
|---|---|---|---|
| 3,220,552 | 11/1965 | Staats | 210/256 |
| 3,465,880 | 9/1969 | Lyall | 210/190 |
| 3,638,794 | 2/1972 | Holzer | 210/140 |
| 3,891,552 | 6/1975 | Prior et al. | 210/264 |
| 4,275,448 | 6/1981 | Le Dall | 364/500 |
| 4,379,057 | 4/1983 | Meiser et al. | 210/140 |

Primary Examiner—Ivars C. Cintins
Attorney, Agent, or Firm—Wenderoth, Lind & Ponack

[57] ABSTRACT

An apparatus for treating a liquid with ion exchange resins includes a main container having a bed of ion exchange resins through which passes the liquid to be treated, and a system for controlling automatically a cycle of regeneration of the ion exchange resins. A device is provided for, during regeneration of the ion exchange resins in the main container, continuing treatment of the liquid. Such device comprises an auxiliary container positioned within the main container and having a bed of ion exchange resins through which passes the liquid to be treated during regeneration of the ion exchange resins in the main container.

5 Claims, 1 Drawing Figure

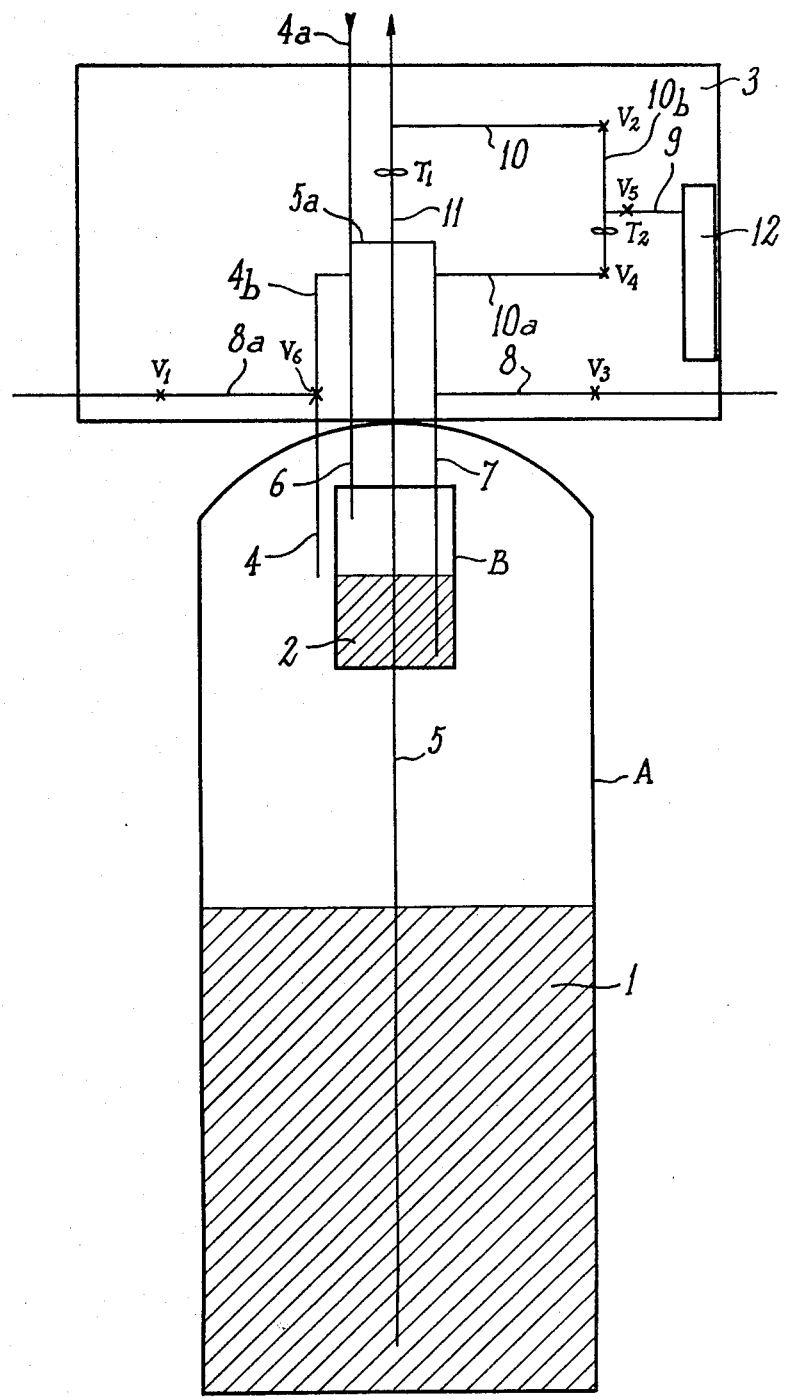

APPARATUS FOR THE UNINTERRUPTED TREATMENT OF A LIQUID WITH ION EXCHANGE RESINS

BACKGROUND OF THE INVENTION

The present invention relates to an apparatus for treating a liquid with ion exchange resins, more particularly to a home water softener apparatus equipped with a mechanism that controls automatically a regeneration cycle of the ion exchange resins.

The present invention more particularly is directed to a home water softener of the type including a treatment tank or container that includes a bed of ion exchange resins. After a certain treatment time during which the resins seize unwanted ions in the water to be treated and replace them with more desirable ions, the resins become exhausted or depleted. Once the resin bed is exhausted, treatment no longer is efficient. However, the exhausted resin bed can be regenerated by the introduction into the resin bed of a brine solution to reverse the ion exchange process. Thus, the resin bed regains its original exchanging capacity.

Devices are known to start automatically the cycle of regeneration by closely monitoring when regeneration is needed and by being programmed to start regeneration at certain intervals. One known device employs a "volume" type of regeneration which is programmed to initiate regeneration every time a selected volume, for example three cubic meters, of liquid has been treated by the water softener apparatus. Regeneration then is activated by a volume control unit and starts at the precise moment of anticipated exhaustion of the resins after a certain volume of water has flowed therethrough. However, since regeneration takes place in the treatment tank itself, the user of the water softener is without treated water during the regeneration cycle.

Other known devices remedy more or less satisfactorily this major drawback by activating the regeneration cycle during periods of anticipated non-use, for example during the night. Thus, some such devices employ so-called "time" regeneration which is activated every given number of days and at a particular time of the day, for example by simple timers, for instance every third day at 2:00 a.m. Other such known devices employ "volume with a time adjustment" regeneration that starts after treatment of a given volume of liquid, but always at an anticipated period of non-use, for instance after a treatment of three cubic meters of liquid but at 3:00 a.m.

A disadvantage of these systems is that they cannot take into account variations in water consumption. Such devices therefore must be set for a maximum use. This however causes a 20 to 30% efficiency loss due to waste of salt and energy.

To avoid both a drop in efficiency and the loss of water use during the regeneration cycle, it is known to install two water softeners that operate alternately. This so-called "alternating" regeneration is activated dependent upon the volume of water that passes through each softener. Regeneration starts immediately after exhaustion is reached, and one softener operates while the other is being regenerated until the cycle of the first softener ends. However, this type of system has the drawbacks that it requires a double installation and therefore twice as much floor space and a substantially higher cost, and since the reserved softener can remain inactive for several days, bacteria can develop therein and remain in the treated water.

SUMMARY OF THE INVENTION

With the above discussion in mind, it is the object of the present invention to provide an improved apparatus for treating a liquid with ion exchange resins, particularly a water softener, whereby it is possible to achieve regeneration without interruption of the availability of treated water and which requires minimal floor space and expense.

This object is achieved in accordance with the present invention by the provision of an apparatus for treating a liquid with ion exchange resins, the apparatus being of the type including a main treatment tank or container having a bed of ion exchange resins through which passes the liquid to be treated, and means for controlling automatically a cycle of regeneration of the ion exchange resins. In accordance with the invention, the apparatus includes a system for, during regeneration of the ion exchange resins in the main container, continuing treatment of the liquid, such system including an auxiliary container positioned within the main container and having a bed of ion exchange resins through which passes the liquid during regeneration of the ion exchange resins in the main container.

The ratio of the volumes of the ion exchange resins in the main container and the auxiliary container is from 12:1 to 5:1. The auxiliary container is positioned in an upper portion of the main container above the resin bed therein. The auxiliary container is operably connected to the automatic mechanism that controls the regeneration cycle, and is physically attached to the main container in any suitable manner, such as by screws. The auxiliary container preferably is made out of a molded plastic material which will have sufficient mechanical strength since, as the auxiliary container is positioned within the main container, its inner and outer walls are subjected only to variations of pressure loss.

The mechanism that automatically activates the regeneration cycle of the resins contained in the main container and the auxiliary container preferably is a microprocessor electronic programming device, constructed according to the teachings of U.S. Pat. No. 4,275,448. The mechanism of the invention includes two flow interceptors that measure the volume of the particular liquid, for example water or brine, that passes through the respective resins during various portions of the cycles of operation of the apparatus. The flow interceptors operate in conjunction with electronic devices attached to electronic valves that start and control the various operations of treatment, regeneration, washing and rinsing according to desired values and based on signals sent by the flow interceptors. The interceptors preferably are turbines that can rotate in opposite directions and thereby which operate no matter which way the fluids flow thereby. The turbines preferably are positioned at locations where the liquids flow thereby sometimes vertically upwardly and sometimes vertically downwardly.

To set the system for various operations, the volume of water necessary for the different stages of regeneration, loosening, suction and rinsing for a given volume of resins are programmed into the memory of the microprocessor. Such automatic settings are based on the volumes of liquid that pass through the resin, and not on the pressure of the liquid. The length of time necessary for regeneration depends on pressure fluctuations.

Thus, no matter what the intake pressure is, the flow control device adjusts the settings automatically to take pressure variations into account. Regeneration of the resins in the main container takes approximately 30 to 45 minutes, and thus the resins in the auxiliary container which are used only while the resins in the main container are being regenerated, i.e. for approximately 30 to 45 minutes every 100 hours, will be used infrequently. Thus, the resins in the auxiliary container require only a very simple and fast regeneration at relatively long intervals.

The automatic setting device employed also makes it easy to know, based on the volumes used, what quantity of brine is necessary for regeneration. It is possible, with the invention disclosed in French Patent Application No. 80 23797, filed Nov. 7, 1980, to determine the concentration of salt in a solution by comparing the volume of solvent entering the solution tank with the volume of saturated solution leaving the solution tank. This volume is achieved with a volume meter that works in both directions and makes it possible to adjust the volume of the solvent according to salt concentration ultimately required. By comparing these volumes, it is possible to determine the density of the brine solution used and the exchange capability thus obtained. The automatic control device also displays clearly whether or not the brine tank needs to be refilled.

BRIEF DESCRIPTION OF THE DRAWING

Other objects, features and advantages of the present invention will be apparent from the following detailed description, taken with the accompanying drawing, wherein:

The single FIGURE comprises a schematic view of an apparatus according to the present invention.

DETAILED DESCRIPTION OF THE INVENTION

The following detailed description will be with reference to a water softener. The water softener includes a main container A that contains a particular volume of ion exchange resins, for example from 14 to 50 liters. Suitably positioned within an upper portion of container A, and above resin bed 1 therein, is an auxiliary container B containing a given volume of ion exchange resins 2, for example from 2 to 6 liters. This assembly is operably connected to an automatic control device 3 controlling the cycle of regeneration of the ion exchange resins.

Water to be softened is supplied by a water distribution system to a pipe 4a and is introduced into container A by an immersed pipe 4. Similarly, water is introduced into auxiliary container B by an immersed pipe 6 which is connected to pipe 4a. Softened water leaves main container A, after treatment therein by resins 1, through an immersed pipe 5 connected to a pipe 11 that is connected to a water user line. A turbine $T_1$ is installed in pipe 11 and is operable in opposite directions. When water is being treated in auxiliary container B, softened water leaves container B through an immersed pipe 7 that is connected to pipe 11.

Brine that is employed to regenerate the resins in the containers A and B is stored in a tank 12 that is connected to containers A and B by a system of pipes 9, 10b, 10, 10a. Pipes 9, 10b, 10 introduce brine into the resin bed 1 in main container A, and therefore are connected to a pipe that ends in pipe 5. Pipes 9, 10a serve the same function for auxiliary container B and are connected to the immersed pipe 7. Pipes 10 and 10a, through pipe 10b that is equipped with a reversable action turbine $T_2$ and electrovalves $V_2$ and $V_4$, are connected to pipe 9 which is connected to tank 12. Pipe 9 has a valve $V_5$.

Pipes 8a and 8, which are equipped with electrovalves $V_1$ and $V_3$, respectively, ensure the evacuation of waste fluids passing from containers A and B after regeneration of the resins therein. Pipe 8 is connected to immersed pipe 7. Pipe 8a is connected to immersed pipe 5 through a portion 4b of the immersed pipe 4 and through a pipe 5a. For the sake of simplicity of illustration and description, it is to be noted that other electrovalves which have not been illustrated in the drawing, are installed at every junction of the above mentioned pipes. It is believed that one of ordinary skill in the art readily will understand the location and manner of operation of such non-illustrated electrovalves. It is to be noted that turbines $T_1$ and $T_2$, each of which is operable in opposite directions, ensure the circulation in the desired directions, to or from the respective containers, of the respective various fluids employed during the different cycles of operation of the apparatus.

The apparatus of the invention operates as follows. Under normal operation, water is treated in container A and no regeneration occurs. At such time, water to be treated is introduced into container A through pipes 4a, 4, is treated by resins 1, and passes from container A via pipes 5, 11. At such time, turbine $T_1$ comes into service depending on the water usage. Valves $V_1$ and $V_3$ employed to evacuate waste fluids and valves $V_2$, $V_4$ and $V_5$ that establish connection with the brine tank 12 are closed. Under the action of turbine $T_1$, water that comes from pipe 4a enters the container through the immersed pipe 4. The softened water passes outwardly through immersed pipe 5 and pipe 11. A microprocessor of the system transmits and adds the number of revolutions of turbine $T_1$. The number of impulses given depends on the volume of resin used in the treatment, on the hardness of the water to be treated and on the quantity of brine that must be drawn from the brine tank 12 for the regeneration process. When the quantity programmed automatically by the microprocessor is reached, regeneration starts.

Regeneration of resin 2 in auxiliary container B occurs first, by action of turbine $T_2$ by drawing in the programmed and adjusted volume of brine from tank 12 which acts on turbine $T_2$ and causes electrovalves $V_4$ and $V_5$ that regulate the quantity of brine down in to open. The brine is brought into the resin bed 2 by pipes 9, 10a and immersed pipe 7. After regeneration of resins 2 is completed, electrovalves $V_4$ and $V_5$ close. Then, rinsing takes place as water is brought into container B from pipes 4a and 6. Valve $V_3$ opens for the evacuation of waste products during the cycle of rinsing of resins 2. As soon as this cycle of regeneration of the resins 2 in container B is completed, regeneration starts in container A and container B immediately is placed into treatment service, i.e. such that the water then is treated in container B. Under the action of turbine $T_1$, water to be softened enters container B through immersed pipe 6, and softened water leaves through pipe 7 and pipe 11, whereby softened water passes to the user system.

Regeneration of the resin 1 in container A takes place as follows. Under the impulse of turbine $T_2$, the desired quantity of brine is drawn from tank 12, and valve $V_5$ is open and valve $V_4$ is closed. Brine is passed into the resin bed 1 after the valve $V_2$ opens, through immersed pipe 5 that is connected to pipe 10. Once regeneration is finished, valves $V_5$ and $V_2$ being closed, rinsing of the resin 1 occurs. Water passes from pipe 4a through immersed pipe 4 into container A. The waste rinse product is evacuated, again under the impulse of turbine $T_1$, through immersed pipe 5, pipe 5a and the upper portion 4b of immersed pipe 4 to which is connected pipe 8a that ensure the evacuation of the waste products by valves $V_6$ and $V_1$ being open. After the rinse waste products have been evacuated from container A, the initially indicated valves are closed, and a new treatment cycle may commense.

Turbine $T_2$ has a threefold function. It measures the volume of brine introduced and transmits that information to the microprocessor memory where it is transformed into data to determine the cycle of the apparatus. It compares the volume of water that goes into the salt tank to that coming therefrom, since the difference between these figures indicates precisely the saturation rate of the absorbed brine. That information then is transmitted to the microprocessor which integrates the data and modifies the cycle accordingly. Turbine $T_2$ also informs the water user of a need for salt in the salt tank when the volumes of water going into the tank and leaving are the same. Turbine $T_2$ controls the filling process in the salt tank for the preparation of the brine.

The apparatus according to the present invention has the advantages of being economical, of taking a relatively small amount of space, and of not interrupting the availability of softened water during regeneration. Accordingly, regeneration can take place more frequently, thereby allowing the use of a smaller apparatus.

Another advantage of the present invention is that, since regeneration in auxiliary container B occurs immediately before in comes into service for use in treating water, bacterial proliferation that occurs in water waiting to be used is avoided.

Also, since the water softener is equipped with an automatic control device which controls volumes at all the stages of the operation, variations of pressure in the water system can be discounted.

Furthermore, by adding the time that each phase of the regeneration process takes and by comparing it with a maximum theoretical time value, it is possible to detect any malfunctions, such as leaks or dirt deposits, and to warn the user thereof.

Although the present invention has been described and illustrated with respect to one particular embodiment thereof, it is to be understood that various modifications and changes may be made to the specifically illustrated and described structural arrangements without departing from the scope of the present invention. Thus, different piping and valving systems, as will be apparent to those skilled in the art may be employed.

Furthermore, it is to be understood that various apparatus employable in carrying out the present invention, such as other non-critical valving and piping arrangements, and also the specific microprocessor control and memory device, have not been described and illustrated in detail, since one of ordinary skill in the art readily would understand the specific configuration, location and operation of such features.

I claim:

1. An apparatus for treating a liquid with ion exchange resins, said apparatus comprising:
    a main container having a bed of ion exchange resins through which passes the liquid to be treated during normal operation of the apparatus;
    an auxiliary container smaller than said main container and positioned within said main container, said auxiliary container having a bed of ion exchange resins through which passes the liquid to be treated during regeneration of said ion exchange resins in said main container, said bed of ion exchange resins in said auxiliary container having a volume smaller than that of said bed of ion exchange resins in said main container; and
    means performing automatically a cycle of regeneration of said ion exchange resins of the apparatus by first regenerating said ion exchange resins in said auxiliary container while passing the liquid to be treated through said ion exchange resins in said main container, immediately upon completion of said regeneration of said ion exchange resins in said auxiliary container regenerating said ion exchange resins in said main container while passing the liquid to be treated through said ion exchange resins in said auxiliary container, and immediately upon completion of said regeneration of said ion exchange resins in said main container returning to normal operation of the apparatus by passing the liquid to be treated through said ion exchange resins in said main container while maintaining said auxiliary container inactive.

2. An apparatus as claimed in claim 1, wherein the ratio of the volumes of said ion exchange resins in said main container and said auxiliary container is from 12:1 to 5:1.

3. An apparatus as claimed in claim 1, wherein said performing means comprises means for activating the cycle of regeneration dependent on the volume of said liquid passed through said ion exchange resins and dependent upon the hardness of said liquid.

4. An apparatus as claimed in claim 1, wherein said performing means comprises means for controlling the duration of the cycle of regeneration of said ion exchange resins in said main container to be from 30 to 45 minutes.

5. An apparatus as claimed in claim 1, wherein said performing means includes means for basing the setting of the regeneration cycle on the quantity of brine used for regeneration.

* * * * *